United States Patent Office 3,256,207
Patented June 14, 1966

3,256,207
CATALYST COMPOSITION
Melvin R. Arnold, Louisville, Ky., assignor to Chemetron Corporation, Chicago, Ill., a corporation of Delaware
No Drawing. Filed Aug. 27, 1962, Ser. No. 219,729
3 Claims. (Cl. 252—455)

This application is a continuation-in-part of my copending application Serial No. 1,185, filed January 8, 1960, now abandoned.

This invention relates to an improved catalyst for the production of mixtures of hydrogen and carbon oxides by reaction of hydrocarbon vapors with gases capable of partially oxidizing said hydrocarbons, such as oxygen, air, steam or carbon dioxide. More particularly, this invention relates to a catalyst useful in the steam-hydrocarbon reaction comprising nickel oxide supported on alumina carrier with a calcium aluminate binder.

It is known that hydrocarbon vapors react with steam, carbon dioxide, air and similar oxygen-containing gases in the presence of a catalyst comprising nickel oxide or a mixture of nickel and magnesium oxides supported on an inert carrier. The hydrocarbon is partially oxidized to hydrogen and carbon oxides, mainly carbon monoxide, and the hydrogen thus produced may be separated and purified for commercial use. The reaction, which is commonly called "reforming," is conducted at high temperature between about 1100° and 1800° F. A catalyst used in this reaction should be heat stable at temperatures well above 2000° F., must be mechanically strong and able to resist thermal shock. It is important that the catalyst be effective soon after being brought up to operating temperature and not require any prolonged activation prior to going on stream. It is also important that the catalyst be stable against shrinkage at high temperature for otherwise the catalyst chamber will require refilling upon continued use. It is likewise advantageous that the catalyst have relatively low bulk density, so long as it is abrasion-resistant and strong, so that a given volume of catalyst chamber can be filled with a relatively small weight of catalyst.

I have discovered a new reforming catalyst which is highly active and has many desirable features which are not exhibited by previously known catalysts used in the hydrocarbon-steam reaction. This catalyst is highly active with low concentrations of nickel, thereby providing economy in manufacture. The catalyst goes on stream immediately and does not require any prior activation. For instance, a fresh charge of the catalyst was brought up to 1300° F. in an atmosphere of nitrogen and then was put on stream with steam and methane; a test made within 5 minutes demonstrated that the catalyst had full activity. In contrast, conventional catalysts usually require several hours, or in some cases, days to achieve full activity under similar conditions.

The catalyst of this invention has substantially greater crush strength than catalysts of nickel oxide supported on hydraulic cement carriers which are now in commercial use. The catalyst does not shrink more than the 5% even at temperatures of 2100° F. which is above the temperature ordinarily encountered in the steam-hydrocarbon reaction. The catalyst is stable up to temperatures of 2500° F. in either an oxidizing or a reducing atmosphere without fusing or loss of activity. The catalyst has a relatively low bulk density and long life in tests conducted at relatively high temperature.

The reforming catalyst of this invention has high activity and converts mixtures of methane and steam to gas mixtures containing very low concentrations of methane even at high space velocity. In short, this catalyst rapidly produces gas mixtures which are very close to equilibrium mixture for the methane-steam reaction. This illustrates the high activity of the catalyst.

It is an object of this invention to provide an improved reforming catalyst which does not require prior activation, which exhibits great thermal strength and low shrinkage at high temperature, which is stable at high temperature against loss of activity or fusion, which has relatively low bulk density and which is active for extended periods of time at high temperature. It is another object of this invention to provide an improved reforming catalyst which is highly active with relatively low nickel content. These and other objects are apparent from and accomplished by the following disclosure.

Broadly, the present invention is directed to a catalyst comprising nickel oxide supported on a carrier of anhydrous alumina and bonded with calcium aluminate which is composed essentially of alumina and calcium oxide. The calcium aluminate contains from about 73% to about 82% $Al_2O_3$ and the remainder is CaO, except for traces of other inorganic materials amounting to not more than 1.5%. Iron oxide and sodium oxide contents of the calcium aluminate should not be greater than 0.5%. The total catalyst, including carrier, should not contain more than 3% silica and if clay is incorporated in the carrier the amount and type of clay should be such that not more than 3% silica occurs in the finished catalyst. The total Group IIA metals (that is, calcium, barium and magnesium) in the finished catalyst should not exceed 10% of the final catalyst, calculated in terms of the metal oxides, whereas the finished catalyst should contain at least 4% CaO by weight.

The catalyst of this invention contains 10% to 25% nickel on a weight basis. It is approximately twice as active as reforming catalysts containing equivalent amounts of nickel, so it is impractical to exceed 25% nickel content. Ordinarily, a maximum nickel content of 20% is satisfactory. Below about 10% nickel content, the catalyst may be expected to lose efficiency during extended use, and generally a nickel content of at least 14% is preferred for best results.

The calcium aluminate binder constitutes about 15% to 55% of the finished catalyst and generally about 20% to 35%. When present, the clay component of the carrier should constitute not more than about 15% of the finished catalyst and usually not more than 3–6%.

The anhydrous alumina which is a component of the carrier for the nickel oxide catalyst is preferably produced from alumina trihydrate which has the chemical formula $Al_2O_3 \cdot 3H_2O$ or $Al(OH)_3$ and contains 64.9% to 65.6% $Al_2O_3$. On calcination of the finished catalyst, the alumina trihydrate is dehydrated to anhydrous alumina. The total amount of anhydrous alumina in the finished catalyst should be in the range of 55% to 85% by weight.

The preparation of the catalyst generally follows the following procedure: To the mixture of hydrated alumina, calcium aluminate, clay (if present) and nickel oxide is added sufficient water to wet the mixture and the resulting mass is mulled for a period of time sufficient to thoroughly wet and homogenize the mixture. The product can then be dried, granulated and pelleted. The pellets may be then cured at room temperature and steamed, followed by calcination to evaporate moisture and convert the hydrated alumina to substantially anhydrous alumina. The calcination is ordinarily completed at temperatures in the range of 1300° to 1600° F.

The Huettner et al. Patent No. 2,038,566, April 28, 1936, describes catalysts containing nickel oxide supported on alumina and other materials which are active in steam-hydrocarbon reaction. The Huettner et al. catalysts, however, have low initial activity, require substantial time before they are effective, and are relatively ineffective in catalyzing the reaction. The catalysts described herein are more effective than the Huettner et al. catalysts, both catalytically and from the standpoint of physical resistance to deterioration. The amount of hydrocarbon leakage with the catalysts described in this application is substantially lower than that which occurs with the Huettner et al. catalysts.

The invention is disclosed in further detail by means of the following examples which are provided merely for purposes of illustration and are not intended to limit the invention. It will be readily appreciated by those skilled in the art that modifications in relative amounts of materials, operating conditions and the like may be made without departing from the invention.

EXAMPLE I

A nickel oxide-alumina catalyst was prepared in accordance with the following procedure: 100 lbs. of alumina trihydrate (65.0% $Al_2O_3$) in fine particle size, 5 lbs. of Kentucky ball clay, 33 lbs. of calcium aluminate (18% CaO, 82% $Al_2O_3$), 28 lbs. of calcined nickel carbonate (essentially nickel oxide containing 70.4% nickel) and 4 lbs. of graphite were placed in a muller and dry mulled for 10 minutes. Approximately 8 gallons of water were then added and mulling continued for 5 minutes. The product was air dried, granulated and pelleted in ½ x ½ inch pellets. The pellets were air-cured for 5 days, steamed for 8 hours with steam at 80 p.s.i.g. and then calcined for 1 hour at 400° F., 1 hour at 600° F. and 8 hours at 1600° F. The finished catalyst contained 15.8% nickel, 0.04% sulfur, 4.7% calcium oxide, 1.8% silica, and 73.8% alumina.

The catalyst pellets were a light green color and had an average side crush strength of 280 lbs. DWL. When heated to 2100° F. the catalyst did not shrink more than 5%. The catalyst could be heated to 2500° F. in either an oxidizing and reducing atmosphere without fusing. The bulk density of the catalyst was 55 lbs. per cubic foot compared to approximately 80 lbs. per cubic foot for conventional nickel reforming catalyst.

The catalyst was charged into a reactor and heated to 1300° F. in an atmosphere of nitrogen and then put on stream at atmospheric pressure with steam and methane in volume proportion of 3 volumes of steam to each volume of methane. Tests made within 5 minutes indicated the catalyst had full activity and after 5 weeks at 1600° F. in a mixture of methane and steam the catalyst showed no change in activity.

EXAMPLE II

An extruded nickel oxide-aluminum catalyst suitable for the reforming reaction was produced as follows: 443 lbs. of alumina trihydrate (65.1% $Al_2O_3$), 209 lbs. of calcium aluminate (27% CaO and 73% $Al_2O_3$), 134 lbs. of calcined nickel carbonate (essentially nickel oxide, 69% nickel), and 26 lbs. of swelling bentonite were placed in a muller and mulled for 10 minutes. A solution of 1 lb. of citric acid in 186 lbs. of water was added and the mulling continued for 10 more minutes. The homogenized wet mass was then extruded through a ½ inch diameter die and the extrusions were air dried for 5 days, steamed for 8 hours with steam at 80 p.s.i.g. and calcined for 1 hour at 400° F., 1 hour at 600° F. and 8 hours at 1600° F. The crush strength of the ½ inch extrusion so prepared was 232 lbs. as compared to 110 lbs. for conventional nickel oxide reforming catalysts. The finished catalyst contained 14% nickel, 5.9% calcium oxide, 2.7% silica and 73% $Al_2O_3$. It had a bulk density of 53 lbs. per cubic foot and developed full activity 30 minutes after being put on stream at 1600° F. in a mixture of methane and steam.

The extruded catalyst so formed was compared to a commercial reforming catalyst containing 30% nickel on a carrier of alumina admixed with ball clay and Portland cement. The following results were observed:

Table I

| Temperature, ° F. | Space Velocity Theoretical Hydrogen | Percent Methane in Dry Product Gas | |
|---|---|---|---|
| | | Catalyst of Ex. II | Commercial Catalyst |
| 1,200 | 5,000 | 5.6–2.0 | 10–15 |
| 1,300 | 5,000 | 0.6 | 2.5–8.5 |
| 1,600 | 5,000 | 0.02 | 0.1–1.0 |
| 1,600 | 10,000 | | 0.1–1.0 |
| 1,525 | 10,000 | 0.07 | |

EXAMPLE III

A catalyst was prepared as in Example I from 19 lbs. alumina (Alcoa C–31), 6 lbs. of nickel oxide (69.0% Ni), 9.4 lbs. of calcium aluminate cement (18% CaO and 82% $Al_2O_3$) and 2 lbs. of Kentucky ball clay. The mixture was dry mulled for 5 minutes, then 6 quarts of water was added and the mixture was wet mulled for 5 minutes. The wet mixture was air cured for 24 hours and calcined for 2 hours at 250° F., 2 hours at 450° F., 2 hours at 650° F. and 8 hours at 1100° F. The catalyst was sized −⅜ inch to +4 mesh.

A catalyst was prepared as in Example 3 of Huettner Patent No. 2,038,566 and then air cured, calcined and sized as above.

The two catalysts were tested in the steam-methane reaction by the following procedure: 50 cc. of catalyst granules were charged to the reactor. The reactor and catalyst charge were heated to 1200° F. under nitrogen, then the nitrogen cut off and steam flow started. Methane in a ratio of 1 volume of methane to 3 volumes of steam was fed to the reactor. The flows of steam and methane were adjusted to give an hourly space velocity of 5000 volumes per volume of catalyst. The activities of the catalysts were determined by measuring the methane leakage in the effluent streams at various temperatures. The results given in the following table show that the catalyst of this example was far more effective than the Huettner et al. catalyst.

| Space Velocity | Temp., ° F. | Hours on Stream | Percent $CH_4$ Leakage | |
|---|---|---|---|---|
| | | | Example III Catalyst | Huettner et al. Catalyst |
| 5,000 | 1,200 | 1.0 | 3.7 | 96.1 |
| 5,000 | 1,400 | 2.5 | 0.3 | 81.0 |
| 5,000 | 1,600 | 4.0 | 0.03 | 0.17 |
| 10,000 | 1,600 | 5.5 | 0.84 | 2.0 |
| 5,000 | 1,600 | 6.5 | 0.05 | 0.14 |

The methane leakages at equilibrium (that is, the concentration of methane in the equilibrium mixture formed by the reaction of methane and steam) are the following:

| 1200° F. | 2.3% | $CH_4$ |
| 1400° F. | 0.18% | $CH_4$ |
| 1600° F. | 0.012% | $CH_4$ |

It is seen that the catalyst of Example III very rapidly produces a gas mixture which very closely approaches the equilibrium composition.

I claim:
1. A catalyst comprising nickel oxide supported on a carrier of anhydrous alumina and clay bonded with a calcium aluminate binder, wherein the nickel content is 10–20% of the finished catalyst weight, the calcium aluminate content is 20–35% of the finished catalyst weight, the clay content is 3–6% of the finished catalyst weight, and the calcium aluminate contains 73–82% $Al_2O_3$, 18–27% calcium oxide and 0–1.5% other inorganic materials, the amounts of iron oxide and sodium oxide each being in the range from 0–0.5%.

2. A catalyst exhibiting the property of very high initial activity suitable for catalyzing the reaction of hydrocarbon vapors with oxygen-containing gases to produce hydrogen and carbon oxides, which comprises nickel oxide supported on a carrier of anhydrous alumina bonded with a calcium aluminate binder, the finished catalyst containing 3% to 6% clay, 10–25% nickel, at least 4% calcium oxide, 0–10% Group II A metals calculated as metal oxides and 0–3% silica, said carrier containing 65% to 90% alumina and said calcium aluminate binder containing 73% to 82% alumina and 27% to 18% calcium oxide with 0% to about 1.5% other inorganic materials and 0% to about 0.5% iron oxide, wherein the calcium aluminate content is 15% to 55% of the weight of the finished catalyst.

3. A catalyst exhibiting the property of very high initial activity suitable for catalyzing the reaction of hydrocarbon vapors with oxygen-containing gases to produce hydrogen and carbon oxides, which comprises nickel oxide supported on a carrier of anhydrous alumina bonded with a calcium aluminate binder, the finished catalyst containing 10–25% nickel, at least 4% calcium oxide, 0–10% Group II A metals calculated as metal oxides and 0–3% silica, said carrier containing 65% to 90% alumina and said calcium aluminate binder containing 73% to 82% alumina and 27% to 18% calcium oxide with 0% to about 1.5% other inorganic materials and 0% to about 0.5% iron oxide, wherein the calcium aluminate content is 15% to 55% of the weight of the finished catalyst.

References Cited by the Examiner

UNITED STATES PATENTS

| | | | |
|---|---|---|---|
| 2,038,566 | 4/1936 | Huettner et al. | 252—459 X |
| 2,056,911 | 10/1936 | Schiller et al. | 252—455 X |
| 2,565,395 | 8/1951 | Scharmann | 252—466 X |
| 2,825,700 | 3/1958 | Ashley et al. | 252—459 |
| 2,897,160 | 7/1959 | Fleming et al. | 252—455 |
| 3,001,953 | 9/1961 | Reitmeier et al. | 252—455 |

BENJAMIN HENKIN, *Primary Examiner.*

MAURICE A. BRINDISI, *Examiner.*

E. J. MEROS, *Assistant Examiner.*